(12) United States Patent
Limberg et al.

(10) Patent No.: US 11,574,560 B2
(45) Date of Patent: Feb. 7, 2023

(54) QUANTUM STATE VISUALIZATION DEVICE

(71) Applicant: International Business Machines Corporation, Armonk, NY (US)

(72) Inventors: Jared Andrew Limberg, Shaker Heights, OH (US); Frederik Frank Flöther, Schlieren (CH); Cameron Donald Ferstat, Dubai (AE); Vinod A. Valecha, Pune (IN)

(73) Assignee: International Business Machines Corporation, Armonk, NY (US)

( * ) Notice: Subject to any disclaimer, the term of this patent is extended or adjusted under 35 U.S.C. 154(b) by 967 days.

(21) Appl. No.: 16/385,183

(22) Filed: Apr. 16, 2019

(65) Prior Publication Data

US 2020/0335011 A1 Oct. 22, 2020

(51) Int. Cl.
*G09B 23/18* (2006.01)
*G06N 10/00* (2022.01)

(52) U.S. Cl.
CPC ........... *G09B 23/186* (2013.01); *G06N 10/00* (2019.01)

(58) Field of Classification Search
CPC .............................. G09B 23/186; G06N 10/00
See application file for complete search history.

(56) References Cited

U.S. PATENT DOCUMENTS

| 8,374,994 | B2 | 2/2013 | Roshen et al. |
| 9,331,695 | B2 | 5/2016 | Koshimura et al. |
| 9,773,208 | B2 | 9/2017 | Betz et al. |
| 2014/0207723 | A1* | 7/2014 | Alboszta ............... B82Y 10/00 706/46 |
| 2014/0264288 | A1* | 9/2014 | Svore ..................... B82Y 10/00 257/31 |
| 2016/0328253 | A1 | 11/2016 | Majumdar |
| 2017/0032017 | A1 | 2/2017 | Morinaga et al. |
| 2018/0107938 | A1 | 4/2018 | Morello |

(Continued)

FOREIGN PATENT DOCUMENTS

| EP | 3383792 A1 | 10/2018 |
| JP | 4904107 B2 | 3/2012 |

(Continued)

OTHER PUBLICATIONS

"Desktop Qubit Model—Poincare and Bloch spheres," by mechatronicsguy, posted on Aug. 17, 2018, retrieved on Jul. 30, 2022, part 1 from https://tinkerings.org/2018/08/17/desktop-qubit-model-poincare-and-bloch-spheres/and part 2 from https://www.thingiverse.com/thing:3053421 (Year: 2018).*

(Continued)

*Primary Examiner* — Eric J. Bycer
(74) *Attorney, Agent, or Firm* — Stosch Sabo

(57) ABSTRACT

A quantum state visualization device comprising at least a portion of a spherical shell and a support structure affixed to the spherical shell. A portion of the support structure can intersect a center of the spherical shell. The quantum state visualization device further comprising a indicator pivotally attached to the support structure at the portion of the support structure intersecting the center of the spherical shell. The indicator is representative of a quantum state based on its position relative to the spherical shell.

20 Claims, 6 Drawing Sheets

(56) References Cited

U.S. PATENT DOCUMENTS

| | | | |
|---|---|---|---|
| 2020/0134503 A1* | 4/2020 | Lupton | G06N 20/10 |
| 2020/0160174 A1* | 5/2020 | Bandyopadhyay | G06N 10/00 |
| 2020/0301562 A1* | 9/2020 | Gupta | G06F 9/455 |

FOREIGN PATENT DOCUMENTS

| | | | |
|---|---|---|---|
| JP | 2019124895 A | * | 7/2019 |
| WO | 2017091870 A1 | | 6/2017 |

OTHER PUBLICATIONS

"Thermosoftening plastics and thermosetting plastics," published on Jun. 3, 2005, and available at http://www.tep.org.uk/a2z/plastics.htm (Year: 2005).*

Altepeter et al., "Multiple-Qubit Quantum State Visualization," Optical Society of America. (Year: 2009).*

QuTIP: Quantum Toolbox in Python, Release 4.3.0, Feb. 26, 2019, retrieved on Jul. 30, 3033, from https://qutip.org/downloads/qutip-doc-4.3.pdf (Year: 2019).*

Wikipedia, "Bloch sphere", From Wikipedia, the free encyclopedia, last edited on Jan. 15, 2019, 5 pages https://en.wikipedia.org/wiki/Bloch_sphere.

Kohnle et al., "A new introductory quantum mechanics curriculum", Jul. 4, 2013, 10 pages.

Johansson et al., "QuTiP: An open-source Python framework for the dynamics of open quantum systems", Computer Physics Communications, Nov. 23, 2011, 16 pages.

* cited by examiner

QUANTUM STATE VISUALIZATION DEVICE

BACKGROUND

The present disclosure relates to learning devices, and, more specifically, to learning devices for quantum computing.

Quantum bits (qubits or qbits) are the basic unit of quantum information in quantum computing and serve a similar function as binary bits do in classical computing. However, while binary bits can exist in only one of two possible states, qubits can exist in a combination (i.e. superposition) of two possible states.

SUMMARY

Aspects of the present disclosure are directed toward a quantum state visualization device comprising at least a portion of a spherical shell, a support structure affixed to the spherical shell, a portion of the support structure intersecting a center of the spherical shell, and an indicator pivotally attached to the support structure at the portion of the support structure intersecting the center of the spherical shell. The indicator is representative of a quantum state based on its position relative to the spherical shell.

Further aspects of the present disclosure are directed toward a system comprising a quantum state visualization device having at least a portion of a spherical shell, a support structure affixed to the spherical shell and intersecting a center of the spherical shell, a 3-axis motor attached to the support structure at the center of the spherical shell, and an indicator attached to the 3-axis motor. The indicator is representative of a quantum state based on its position relative to the spherical shell. The system further comprises a control unit communicatively coupled the quantum state visualization device and comprising a computer-readable storage medium storing program instructions and a processor configured to execute the program instructions to cause the control unit to perform a method comprising converting quantum state information to three-dimensional coordinates. The method further comprising transmitting the three-dimensional coordinates to the 3-axis motor to cause the 3-axis motor to orient the indicator in the spherical shell according to the three-dimensional coordinates.

Further aspects of the present disclosure are directed toward a method for visualizing a quantum state on a three-dimensional quantum state visualization device, the method comprising inputting, to a control unit communicatively coupled to the three-dimensional quantum state visualization device, first quantum state information. The method further comprises converting the first quantum state information to three-dimensional coordinates. The method further comprises moving an indicator of the three-dimensional quantum state visualization device to the three-dimensional coordinates corresponding to the first quantum state information The present summary is not intended to illustrate each aspect of, every implementation of, and/or every embodiment of the present disclosure.

BRIEF DESCRIPTION OF THE DRAWINGS

The drawings included in the present application are incorporated into, and form part of, the specification. They illustrate embodiments of the present disclosure and, along with the description, serve to explain the principles of the disclosure. The drawings are only illustrative of certain embodiments and do not limit the disclosure.

Figure 1:
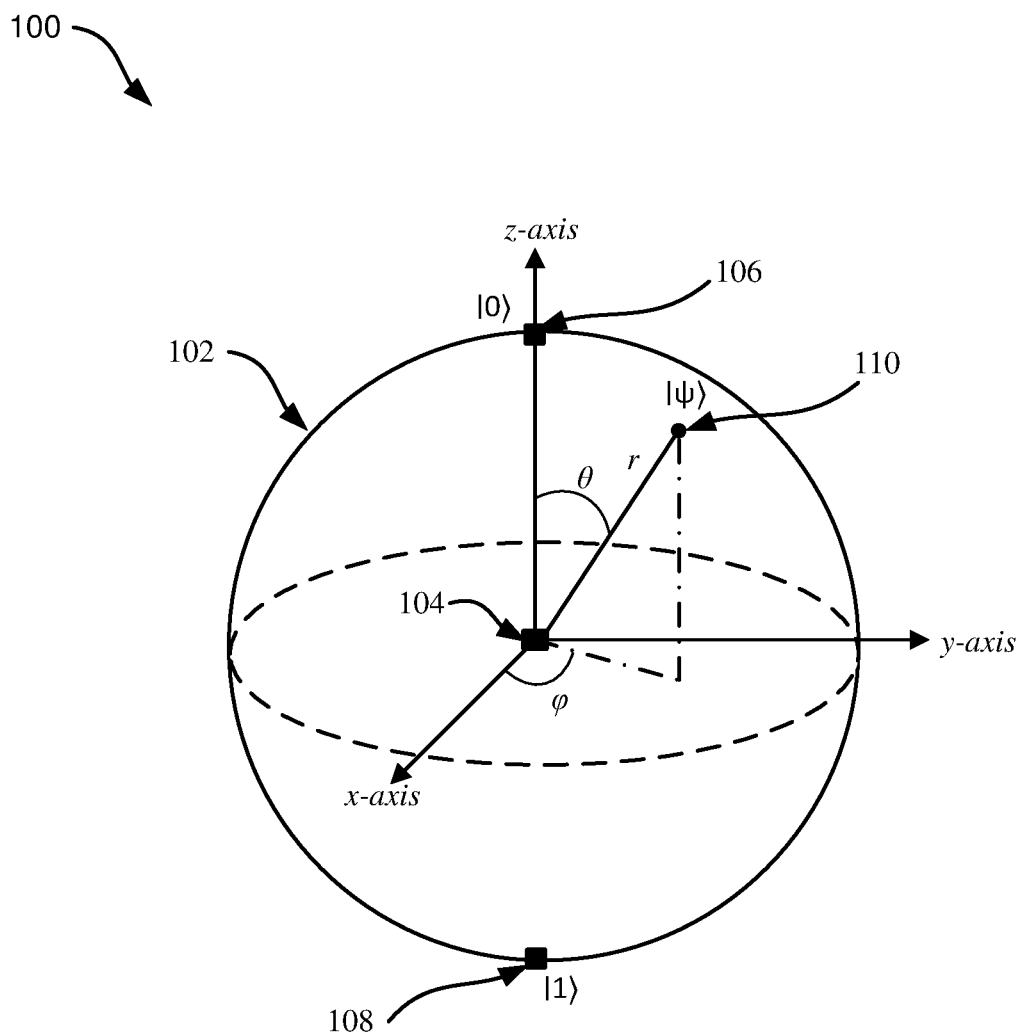
FIG. 1 illustrates a block diagram of an example Bloch sphere, in accordance with embodiments of the present disclosure.

While the present disclosure is amenable to various modifications and alternative forms, specifics thereof have been shown by way of example in the drawings and will be described in detail. It should be understood, however, that the intention is not to limit the present disclosure to the particular embodiments described. On the contrary, the intention is to cover all modifications, equivalents, and alternatives falling within the spirit and scope of the present disclosure.

DETAILED DESCRIPTION

Aspects of the present disclosure are directed toward learning devices, and, more specifically, to learning devices for quantum computing. While not limited to such applications, aspects of the present disclosure may be better understood in light of the aforementioned context.

Quantum computing is a challenging field to learn, especially for people without a background in higher-level physics and mathematics. In order to educate people about quantum computing, there is a need for interactive learning devices that aid educators, students, and professionals in intuitively grasping fundamental concepts associated with quantum computing.

One such fundamental concept associated with quantum computing relates to quantum states of quantum bits (qubits or qbits). Qubits are the basic unit of quantum information in quantum computing and serve a similar function as binary bits do in classical computing. However, while binary bits can exist in only one of two possible states, qubits can exist in a combination (i.e., superposition) of two possible states.

The various quantum states of a qubit can be represented by a Bloch sphere. As is understood by one of skill in the art, the Bloch sphere represents the theoretical three-dimensional (3D) state space of a qubit. However, Bloch spheres are traditionally presented on two-dimensional (2D) media such as paper and electronic screens. Viewing Bloch spheres on 2D media is less intuitive than a physical representation of a Bloch sphere in 3D. Aspects of the present disclosure are directed to a physical, 3D quantum state visualization device for visualizing, in 3D, the representations of a Bloch sphere. The 3D quantum state visualization device can be augmented with manual, magnetic, electronic, or hybrid controls enabling a user to view different quantum states, and, in some embodiments, view the trajectory of a change from one quantum state to another quantum state (e.g., as a qubit interacts with one or more quantum logic gates in a quantum system). Collectively, the 3D quantum state visualization device discussed herein enables users to better understand quantum mechanics, and, in particular, quantum states of qubits.

First, a general discussion of the present disclosure may be helpful. The quantum state visualization device discussed herein includes at least a portion of a spherical shell (e.g., a whole sphere, a half sphere, a three-quarter sphere, etc.) having inside it an indicator used to visualize a quantum state. The indicator can be pivotally connected to a support structure at a center of the spherical shell (i.e., the origin). The support structure can be attached to the spherical shell at one, two, or a different number of connection points. The indicator can be pivotally connected to the support structure by, for example, a ball-and-socket connection, a 3-axis motor, or a different connecting mechanism that allows the indicator to move about a majority of the spherical shell.

The indicator can be articulated about the spherical shell to represent different quantum states. The indicator is moved based on manual input (e.g., a user providing rotational and/or translational forces to a knob physically attached to the indicator), magnetic input (e.g., a user moving a magnetized device around an outside of the spherical shell, where the indicator is attracted to the magnetized device), electronic input (e.g., 3D coordinates provided to a 3-axis motor causing the 3-axis motor to orient the indicator according to the 3D coordinates), and/or a hybrid combination of the aforementioned techniques.

In some embodiments, the quantum state visualization device is communicatively coupled to a control unit. As a first example, the quantum state visualization device can be connected by a wired connection to a joystick, where manipulating the joystick causes changes to the orientation of the indicator. As a second example, the quantum state visualization device can be connected to a user device (e.g., smartphone, tablet, computer, etc.) by a wireless connection (e.g., Wi-Fi, BLUETOOTH®, etc.), and the user device can execute software capable of receiving quantum state information as input, converting the quantum state information to 3D coordinates, and transmitting the 3D coordinates to the quantum state visualization device to actuate a 3-axis motor to orient the indicator according to the 3D coordinates. Optionally, in some embodiments, the 3D coordinates are transmitted with a predefined route to the 3-axis motor, so that the 3-axis motor orients the indicator from a first position to a second position according to the predefined route. In such embodiments, the predefined route can be used to visualize interaction between a qubit and one or more quantum logic gates as it transitions between various quantum states. As a third example, the quantum state visualization device can be connected to multiple user devices (e.g., a smartphone, tablet, computer, etc.) by a wireless connection (e.g., Wi Fi, BLUETOOTH®, etc.) and provide quantum state information to the connected multiple devices related to the orientation of the indicator.

Aspects of the present disclosure exhibit numerous advantages including, but not limited to, the following list of example advantages realized by various aspects of the present disclosure. As a first example advantage, aspects of the present disclosure provide 3D visualization of quantum states. This advantage is realized by the physical, three-dimensional structures making up the quantum state visualization device. This advantage improves over other techniques (e.g., 2D Bloch sphere representations) by allowing learners to visualize quantum states without having to perform a mental abstraction step from a 2D paper/screen representation of a Bloch sphere to the 3D reality the Bloch sphere represents.

As a second example advantage, aspects of the present disclosure are capable of visualizing both pure quantum states (e.g., on the surface of the spherical shell of the 3D quantum state visualization device) and mixed quantum states (e.g., internal to the spherical shell of the 3D quantum state visualization device). This advantage enables learners to intuitively understand pure quantum states and mixed quantum states. This advantage is realized by (1) having a partial spherical shell, where the partial spherical shell includes an opening enabling a user to view the indicator inside of the partial spherical shell, and/or (2) having at least a portion of the spherical shell fabricated from a transparent or semi-transparent material.

As a third example advantage, aspects of the present disclosure are capable of visualizing specific quantum states (e.g., predefined quantum states such as a ground state). Visualizing specific quantum states is beneficial for performing directed education, where a student has one or more preset reference points from which to begin learning about quantum states. Specific quantum states can be presented using one or more of: (1) predefined stops incorporated into the quantum state visualization device; and/or (2) receiving input quantum state information to a user device, converting the quantum state information to 3D coordinates, and sending the 3D coordinates to a 3-axis motor of the quantum state visualization to device to cause the quantum state visualization device to orient the indicator according to the 3D coordinates, thereby representing the received quantum state information. Regarding the first option, predefined stops can be useful for manual and/or magnetic quantum state visualization devices that may not have the benefit of a 3-axis motor.

As a fourth example advantage, aspects of the present disclosure are capable of visualizing specific quantum state transitions between a first quantum state and a second quantum state. This fourth example advantage improves educational outcomes by enabling learners to visualize a qubit transitioning from one quantum state to another quantum state via one or more quantum logic gates. This fourth example advantage is realized by a control unit communicatively coupled to a quantum state visualization device, where the control unit is able to convert 3D coordinates of the indicator in a first position to a first quantum state, receive a second quantum state, determine a transition path between the first quantum state and the second quantum state, convert the transition path to 3D coordinates, and transmit the 3D coordinates corresponding to the transition path to the quantum state visualization device to cause the indicator to follow the 3D coordinates representing the transition path from the first quantum state to the second quantum state.

The aforementioned advantages are example advantages, and embodiments exist that can realize all of, some of, or none of the aforementioned advantages while remaining within the spirit and scope of the present disclosure.

FIG. 1 illustrates a generic Bloch sphere 100, in accordance with embodiments of the present disclosure. Bloch sphere 100 includes a spherical surface 102 defined in a 3D space represented using an x-axis, y-axis, and z-axis intersecting each other at center 104 (i.e., origin). The Bloch sphere 100 includes two antipodal points (e.g., sometimes referred to as the north-pole and south-pole points) representing a first basis vector 106 corresponding to the quantum state |0⟩ (e.g., ground state vector) and a second basis vector 108 corresponding to the quantum state |1⟩ (e.g., opposite state vector). The Bloch sphere 100 further includes a visualized state 110 that is represented by the notation |ψ⟩ and defined by an angle θ relative to the z-axis, an angle φ relative to the x-axis, and a distance r (for pure states, distance r equals the radius of the spherical surface 102, while for mixed states, distance r is less than the radius of the spherical surface 102). Thus, Bloch sphere 100 enables a visualized quantum state 110 (e.g., |ψ⟩) to be represented using spherical, cylindrical, or Euclidean coordinates in 3D space, where the visualized quantum state 110 intersects the center 104 of the spherical surface 102. Aspects of the present disclosure are directed to a quantum state visualization device embodying, in three dimensions, a Bloch sphere 100 and capable of showing a visualized quantum state 110 using an indicator that moves about the spherical surface 102 based on manual, electronic, magnetic mechanisms, and/or hybrid mechanisms.

Referring now to FIGS. 2A-2B, 3A-3B, and 4A-4B, the aforementioned figures illustrate elements of various embodiments of the present disclosure for illustrative purposes and are not to be taken in a limiting sense. The various elements discussed in the various embodiments can be substituted into, added to, or otherwise incorporated into other embodiments of the present disclosure to create hybrid quantum state visualization devices and/or alternative quantum state visualization devices while remaining within the spirit and scope of the present disclosure.

Furthermore, the relative sizes and/or shapes of the various components illustrated hereinafter with respect to FIGS. 2A-2B, 3A-3B, and 4A-4B are not necessarily to scale (either in terms of literal dimensions or relative dimensions) and these figures are illustrated for ease of discussion and are not intended to exactly replicate particular embodiments of the present disclosure. Example materials, dimensions, properties, and fabrication techniques are discussed following the figures to avoid duplication of explanation.

Figure 2A:
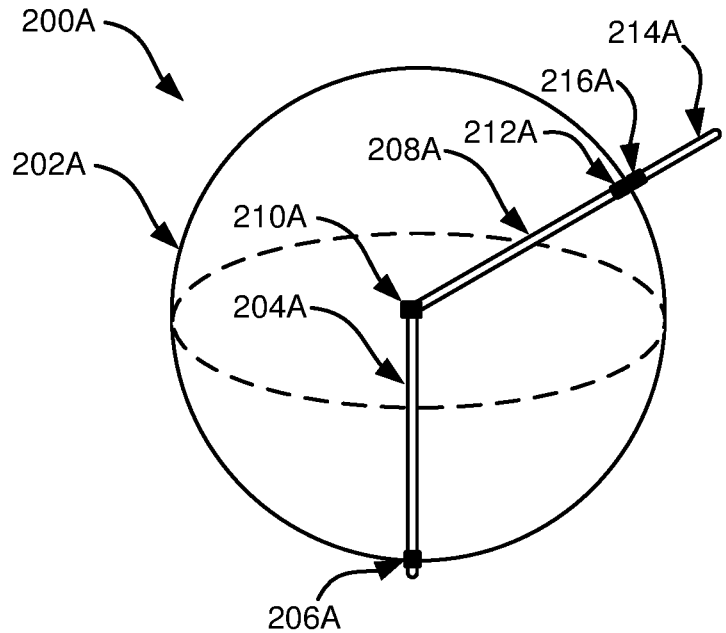
FIG. 2A illustrates a block diagram of an example magnetic quantum state visualization device, in accordance with embodiments of the present disclosure.

FIG. 2A illustrates a magnetic quantum state visualization device 200A having at least a portion of a spherical shell 202A, a support structure 204A intersecting the spherical shell 202A at a single point 206A, and where an end of the support structure 204A is approximately located at a center of the spherical shell 202A. The support structure 204A can be connected to an indicator 208A at a pivotal connection 210A located approximately at an end of the support structure 204A and approximately in the center of the spherical shell 202A. The indicator 208A can be used to visualize a quantum state by articulating the indicator 208A around the spherical shell 202A. Indicator 208A can have a magnet 212A disposed on one end near the spherical shell 202A. A user can hold a manipulation device 214A having an oppositely charged magnet 216A outside of the spherical shell 202A and can manipulate the indicator 208A using the manipulation device 214A and the magnetic force created between the magnet 212A of the indicator 208A and the oppositely charged magnet 216A of the manipulation device 214A through the spherical shell 202A.

The support structure 204A can terminate at the single point 206A with the spherical shell 202A, or, in some embodiments, the support structure 204A can extend beyond the single point 206A to provide, for example, a handle (not shown) for a learner or an educator to hold the magnetic quantum state visualization device 200A while using it.

Figure 2B:
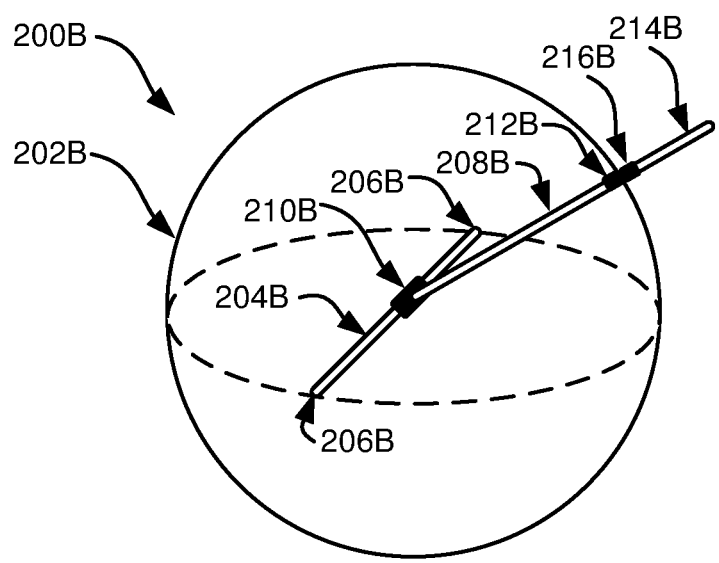
FIG. 2B illustrates a block diagram of an example alternative magnetic quantum state visualization device, in accordance with embodiments of the present disclosure.

FIG. 2B illustrates one alternative design of a magnetic quantum state visualization device 200B including at least a portion of a spherical shell 202B having a support structure 204B within the spherical shell 202B and intersecting the spherical shell 202B at two or more points 206B (e.g., two antipodal points). The support structure 204B is attached to an indicator 208B at a pivotal connection 210B at or near the center of spherical shell 202B. The indicator 208B includes a magnet 212B attracted to an oppositely charged magnet 216B of a manipulation device 214B.

Thus FIG. 2B illustrates one alternative magnetic quantum state visualization device configuration, however, other alternatives are possible. For example, the spherical shell 202A, 202B can be a partial shell (e.g., half-shell, three-quarter shell, etc.). As another alternative, the oppositely charged magnets 216A, 216B can instead be ferromagnetic metals capable of reacting to a magnetic field but incapable of permanently holding a magnetic field, whereas magnets 212A, 212B can be permanent magnets or electromagnets.

Although not explicitly shown, in some embodiments, magnetic quantum state visualization devices 200A, 200B include one or more preset positions. Preset positions can have the advantage of demonstrating certain quantum states to assist in educating a user. Preset positions in a magnetic quantum state visualization device 200A, 200B can be realized by, for example, incorporating surface modifications to the spherical shell 202A, 202B, such that the surface modifications indicate where the preset positions are located. One example of surface modifications includes imprints (e.g., depressions, dimples, etc.), where the spherical shell 202A, 202B includes an imprint capable of receiving a portion of the oppositely charged magnet 216A, 216B of the manipulation device 214A, 214B. Imprints have the advantage of providing a tactile indication of the location of the preset position such that a user moving manipulation device 214A, 214B across the surface of spherical shell 202A, 202B recognizes the preset position by feeling the manipulation device 214A, 214B "click" into place in the imprint, and by further feeling the increased magnetic force generated by the magnet 212A, 212B and oppositely charged magnet 216A, 216B being attracted to one another through a thinner portion of the spherical shell 202A, 202B relative to other portions of the spherical shell 202A, 202B. Other surface modifications are possible, including information (e.g., text, markings, symbols, colors, etc.) printed on, embossed, on, or otherwise incorporated into the spherical shell 202A, 202B and useful for indicating the location of one or more preset positions.

Figure 3A:
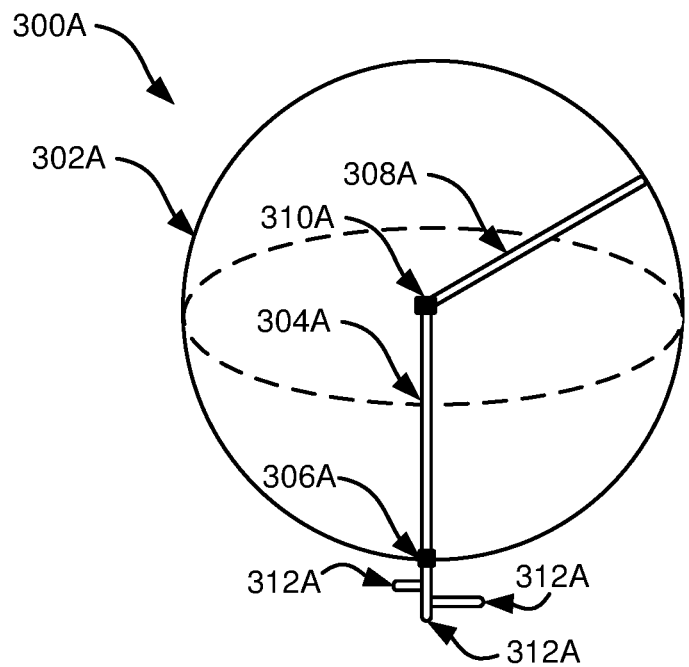
FIG. 3A illustrates a block diagram of an example manual quantum state visualization device, in accordance with embodiments of the present disclosure.

FIG. 3A illustrates an example manual quantum state visualization device 300A including at least a portion of a spherical shell 302A and a support structure 304A connected to the spherical shell 302A at a single point 306A. The support structure 304A is attached to an indicator 308A by a pivotal connection 310A located at the approximate center of the spherical shell 302A and enabling the indicator 308A to be moved around the spherical shell 302A in order to represent different quantum states. The manual quantum state visualization device 300A further includes one or more rotational manipulators 312A (e.g., knobs, gears, etc.) useful for manually modifying the location of the indicator 308A within the spherical shell 302A. As one example, FIG. 3A illustrates three rotational manipulators 312A such that each one is rotatable to move the indicator 308A about one of the three primary axes (e.g., x-axis, y-axis, and z-axis). Rotational manipulators 312A can include, for example, sequences of gears capable of conveying rotation at a rotational manipulator 312A to a rotation at the pivotal connection 310A to move the indicator 308A. Rotational manipulators 312A can include, but are not limited to, one or more of: external gears, internal gears, spur gears, helical gears, bevel gears, spiral bevel gears, hypoid gears, crown gears, worm gears, rack and pinion systems, and/or other mechanical systems useful for transferring rotational and/or translational forces from the rotational manipulators 312A to rotational and/or translational movements at the indicator 308A.

Figure 3B:
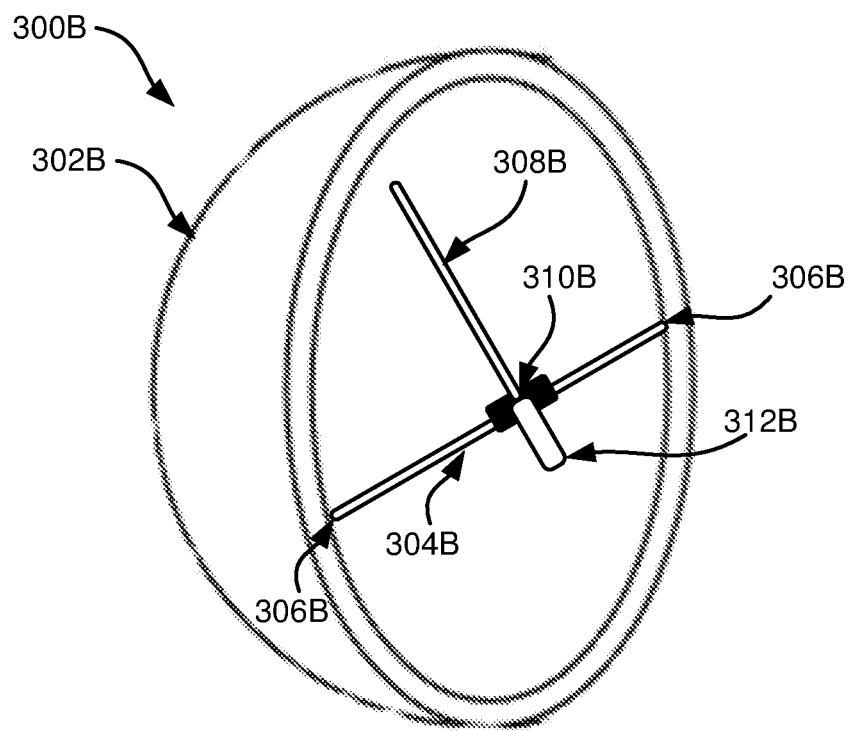
FIG. 3B illustrates a block diagram of an example alternative manual quantum state visualization device, in accordance with embodiments of the present disclosure.

FIG. 3B illustrates an alternative manual quantum state visualization device 300B having half a spherical shell 302B and a support structure 304B intersecting the spherical shell 302B at two or more points 306B (e.g., antipodal points). The support structure 304B is affixed to an indicator 308B at a pivotal connection 310B that is located on the support structure 304B at an approximate center of the spherical shell 302B. In this alternative manual quantum state visualization device 300B, the location of the indicator 308B in the spherical shell 302B is based on user manipulation of a manual knob 312B, where the manual knob 312B translates rotation and/or translation of the manual knob 312B into movement of the indicator 308B about the spherical shell 302B. In some embodiments, the manual knob 312B includes one or more gear systems such as the gears described above with respect to rotational manipulators 312A.

In some embodiments, the manual knob 312B is of unitary construction with the indicator 308B, affixed to the support structure 304B by a pin connection (e.g., a connection preventing translation in any direction and enabling rotation around a first axis), where the support structure 304B is rotatable around a second axis (e.g., a second axis that is orthogonal to the first axis). In such an embodiment, the support structure 304B is beveled at the pivotal connection 310B to allow the manual knob 312B and the indicator 308B to pivot around the first axis of the pin connection.

Figure 4A:
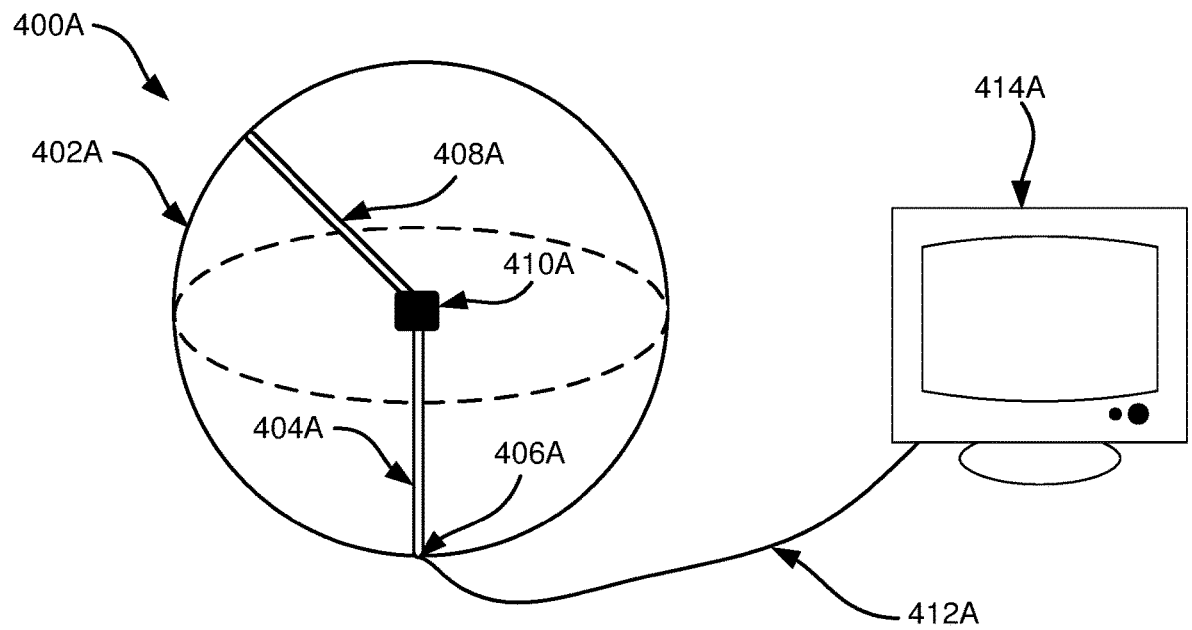
FIG. 4A illustrates a block diagram of an example electronic quantum state visualization device, in accordance with embodiments of the present disclosure.

FIG. 4A illustrates an example electronic quantum state visualization device 400A having at least a portion of a spherical shell 402A, a support structure 404A affixed to the spherical shell 402A at a single point 406A and extending to an approximate center of the spherical shell 402A. The support structure 404A is affixed to an indicator 408A at a 3-axis motor 410A located on an end of the support structure 404A and located in an approximate center of the spherical shell 402A. The 3-axis motor 410A is configured to operate via input through a wired connection 412A from a control unit 414A such as, but not limited to, a computer, desktop, laptop, tablet, smartphone, a joystick, or other device.

The control unit 414A can be configured to implement the methods described hereinafter with respect to FIGS. 5A and 5B. In some embodiments, the control unit 414A receives user input in the form of quantum state information (e.g., a|0⟩+b|1⟩, where a and b represent relative deviations from the primary basis vectors). The control unit 414A converts the quantum state information to a set of 3D coordinates (e.g., cylindrical, spherical, Euclidean) using equations and calculations known in the field of Bloch spheres, Hilbert spaces, and/or quantum mechanics. The control unit 414A provides the 3D coordinates to the 3-axis motor 410A and causes the 3-axis motor 410A to orient the indicator 408A according to the 3D coordinates, where the indicator 408A oriented according to the 3D coordinates represents the quantum state information input to the control unit 414A.

Figure 4B:
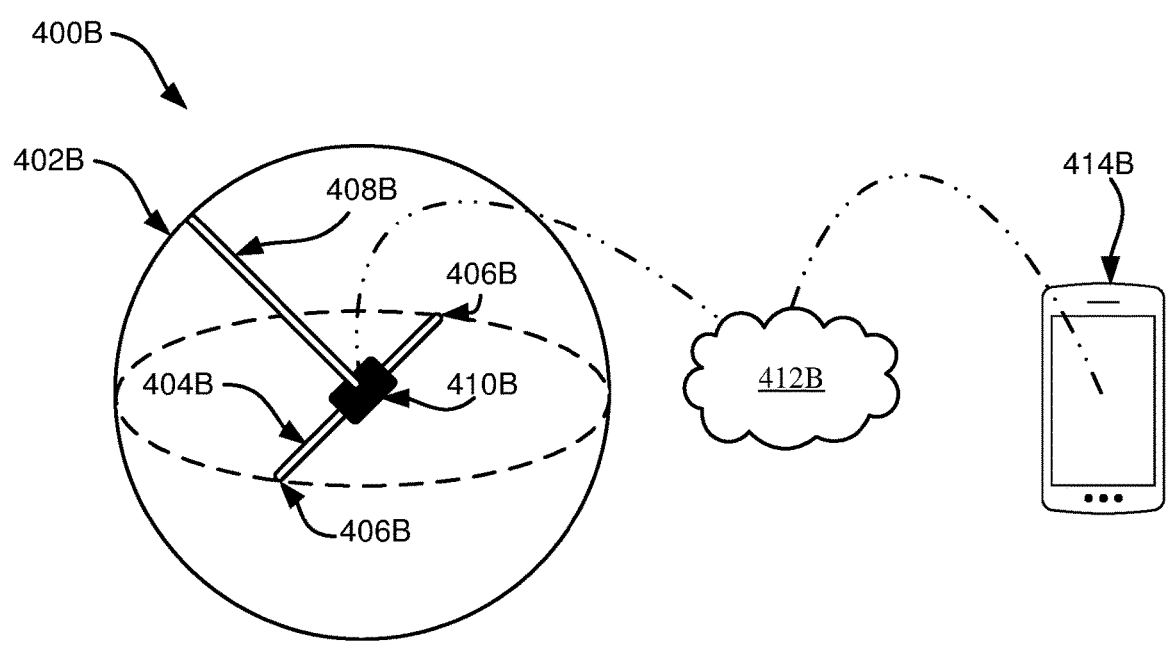
FIG. 4B illustrates a block diagram of an example alternative electronic quantum state visualization device, in accordance with embodiments of the present disclosure.

FIG. 4B illustrates an alternative electronic quantum state visualization device 400B having at least a portion of a spherical shell 402B having a support structure 404B affixed to the spherical shell at two or more points 406B (e.g., antipodal points) and attached to an indicator 408B pivotally attached to the support structure 404B at a 3-axis motor 410B. The 3-axis motor 410B is configured to move the indicator 408B about the spherical shell 402B to represent different quantum states. The 3-axis motor 410B can include a wireless transmitter (not shown) capable of communicating by a wireless network 412B with a user device 414B (e.g., smartphone, mobile phone, tablet, smart glasses, virtual reality headsets, and so on). The user device 414B can be configured to execute methods discussed hereinafter with respect to FIGS. 5A and 5B.

The wireless network 412B can include, for example, ANT/ANT+, BLUETOOTH®, cellular (e.g., 3G, 4G, 5G, etc.), infrared, 6LoWPAN, Ultra-wideband (UWB), long range RFID, Wi Fi, wirelessHART, and/or WirelessHD protocols.

In some embodiments, the user device 414B executes a mobile application configured to receive quantum state information from user input to the user device 414B, convert the quantum state information to 3D coordinates, transmit the 3D coordinates to the 3-axis motor 410B via the wireless network 412B, where the transmitted 3D coordinates cause the 3-axis motor 410B to orient the indicator 408B according to the 3D coordinates, the oriented indicator 408B representing the quantum state contained in the quantum state information received at the mobile application executing on the user device 414B.

In some embodiments, the quantum state visualization device 400B is configured to transmit quantum state information related to the orientation of the indicator 408B to numerous user devices 414B (although only one is shown in FIG. 4B). Such embodiments are useful for directing learning amongst a classroom of students simultaneously viewing a single quantum state visualization device.

3-axis motors 410A, 410B can function using direct current (DC) power or alternating current (AC) power. The power can be supplied to 3-axis-motors 410A, 410B by a battery, a corded connection (e.g., wired connection 412A), or an electromagnetic field (e.g., inductive charging). The 3-axis motor 410A, 410B can be, but is not limited to, a rotary motor (e.g., coreless rotor motor, axial rotor motor, servo motor, stepper motor, etc.), a linear motor, a synchronous motor, an induction motor, a universal AC/DC motor, an electronic commutator (EC) motor, a brushed DC motor, or another type of motor. Although 3-axis motors are primarily discussed, in some embodiments, 2-axis motors can also be used.

Although FIGS. 4A and 4B are discussed with respect to a single electronic quantum state visualization device, they are also applicable to a plurality of quantum state visualization devices, where the plurality of quantum state visualization devices can be simultaneously manipulated to approximate a multi-qubit system.

Now for a general discussion of the materials and manufacturing techniques relevant to FIGS. 2A-2B, 3A-3B, and/or 4A-4B.

Any of the spherical shells (e.g., 202A, 202B, 302A, 302B, 402A, and/or 402B) can be any portion of a spherical shell such as, but not limited to, a full sphere, a half-sphere, a three-quarter-sphere, or a different amount of a sphere. In various embodiments, the spherical shells can have a diameter of between approximately twenty-five millimeters (one inch) and 910 millimeters (thirty-six inches). In various embodiments, the spherical shells can have a thickness between approximately 2.5 millimeters (0.10 inches) and twenty-five millimeters (1.00 inches). In various embodiments, the spherical shells are translucent, transparent, semi-transparent, or opaque.

Support structures (e.g., 204A, 204B, 304A, 304B, 404A, and/or 404B) can have a cylindrical cross-section (e.g., rod), a rectangular cross-section (e.g., bar), an alternative cross-section (e.g., C-channel, I-beam, etc.), or a variable cross-section. Support structures approximately intersect a center of the spherical shell, as such, support structures can have a length approximately equal to the diameter of the spherical shell (in embodiments where the support structure intersects the spherical shell at two points 206B, 306B, 406B) or approximately equal to half of the diameter of the spherical shell (in embodiments where the support structure intersects the spherical shell at one point 206A, 306A, 406A). In some embodiments, the support structures can have a thickness of approximately 2.5 millimeters (0.10 inches) to fifty-one millimeters (2.0 inches) depending on various design factors.

Indicators (e.g., 208A, 208B, 308A, 308B, 408A, and/or 408B) can be physical indicators or laser indicators. Physical indicators can be a rod, bar, or other structure. In some embodiments, physical indicators have a length approximately equal to half of the diameter of the spherical shell. In some embodiments, physical indicators include mechanisms for illustrating mixed quantum states (e.g., states that exist between the center and the spherical shell). As one example, a physical indicator can be extendable and retractable to demonstrate a mixed quantum state. As another example, a physical indicator can have a series of lights along the length of the physical indicator, where powering on a light at a predetermined position of the physical indicator can be used to represent a mixed quantum state. Laser indicators project a laser (e.g., beam of light) toward the spherical shell to visualize a quantum state. Laser indicators can include, but are not limited to, gas lasers (e.g., chemical lasers, excimer lasers), solid-state lasers, fiber lasers, photonic crystal lasers, semiconductor lasers, dye lasers, free-electron lasers, or a different laser.

Although the aforementioned embodiments generally discuss a single indicator, it is also within the spirit and scope of the present disclosure to generate the single indicator as a holographic image generated by multiple lasers, where the multiple lasers are embedded within the interior of the spherical shell and rotatably directed throughout the interior of the spherical shell to create the hologram of a moving indicator.

The spherical shells (e.g., 202A, 202B, 302A, 302B, 402A, and/or 402B), support structures (e.g., 204A, 204B, 304A, 304B, 404A, and/or 404B), and/or indicators (e.g., 208A, 208B, 308A, 308B, 408A, and/or 408B) can be fabricated from one or more materials selected from the group consisting of: plastic, thermoplastic, thermoset plastic, thermoplastic elastomer, polymeric, composite, glass, ceramic, metal, wood, plaster, or a different material, in accordance with various embodiments of the present disclosure. Some example plastics that can be used include, but are not limited to, General Purpose Polystyrene (GPPS), Methylmethacrylate Acrylonitrile Butadiene Styrene (MABS), Styrene Acrylonitrile (SAN), Styrene Methyl Methacrylate (SMMA), Methacrylate Butadiene Styrene (MBS), Styrene Butadiene (SB) copolymer, Polycarbonate (PC), Polyethylene Terephthalate (PET), Polyethylene Terephthalate Glycol-modified (PET-G), Polymethylmethacrylate (PMMA), Polyetherimide (PEI), Polyethersulfone (PES), Polysulfone (PSU), Polypropylene (PP), Low-Density Polyethylene (LDPE), Polylactic Acid (PLA), Styrene Ethylene Butylene Styrene (SEBS), Thermoplastic Polyurethane (TPU), and/or other plastics.

The support structures can be affixed to the spherical shells at one or more points using mechanical fastening, adhesive bonding, metallic welding, polymeric welding (e.g., ultrasonic welding), insert-molding, or a different technique.

The spherical shells, support structure, indicators, and/or other components can be fabricated by, for example, molding (e.g., compression molding, transfer molding, injection molding, thermoforming, blow-molding, resin-transfer molding (RTM), vacuum-assisted resin transfer molding (VARTM), autoclave molding, etc.), additive manufacturing (e.g., 3D-printing, vat photopolymerization, material jetting, binder jetting, powder bed fusion, material extraction, directed energy deposition, sheet lamination, welding, etc.), glassblowing (e.g., mold-blowing, free-blowing, etc.), machining (e.g., computer numerical control (CNC)), sintering, forging, and/or other manufacturing techniques.

In embodiments where the indicator is pivotally attached to the support structure, the pivotal connection (e.g., 210A, 210B, 310A, 310B) can be realized by a ball-and-socket connection, a revolute joint, a 3-axis junction box, a 3-axis motor, or a different configuration capable of allowing the indicator to move in three dimensions with respect to the support structure.

Figure 5A:
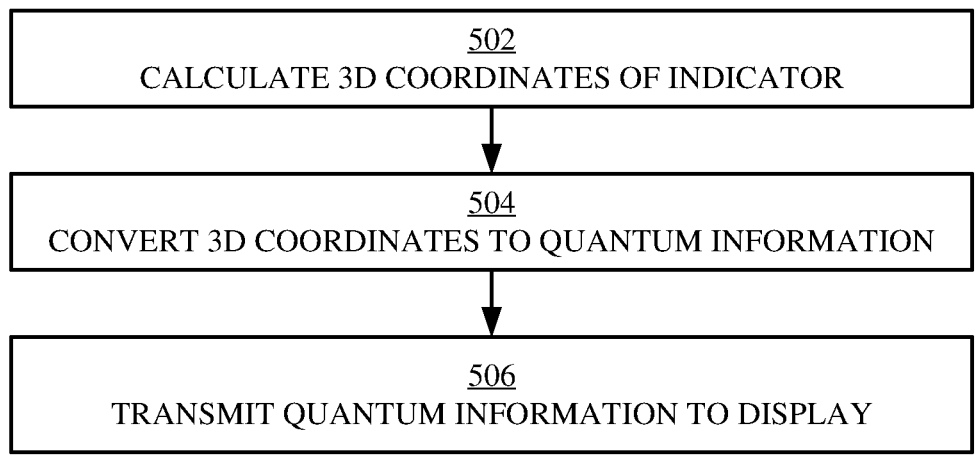
FIG. 5A illustrates a flowchart of an example method for converting orientation information from an indicator in a quantum state visualization device to quantum state information, in accordance with embodiments of the present disclosure.

FIG. 5A illustrates an example method 500 for converting a location of an indicator in a quantum state visualization device into quantum state information, in accordance with embodiments of the present disclosure. The method 500 can be implemented by a control unit integrated into, or communicatively coupled to, a quantum state visualization device (e.g., control unit 600 of FIG. 6).

Operation 502 includes calculating 3D coordinates of an indicator in a spherical shell. The 3D coordinates can be based on, for example, one or more of: a center of the spherical shell (e.g., the connection between the indicator and a support structure), a length of the indicator, and one or more angles reflecting an orientation of the indicator within the spherical shell (e.g., an offset from an axis, an offset from a plane, etc.). The 3D coordinates can be cylindrical coordinates, spherical coordinates, Euclidean coordinates, or a custom coordinate notation system useful for modifying the position of the indicator in the quantum state visualization device.

Operation 504 includes converting the 3D coordinates to quantum state information. The 3D coordinates can be converted to quantum state information using equations, algorithms, and/or transformations known in the art of quantum mechanics, particularly in relation to Hilbert spaces and/or Bloch spheres.

Operation 506 includes transmitting the quantum state information to a display, where the transmission enables the quantum state information to be presented on the display. The display can be, but is not limited to, a desktop, a laptop, a smartphone, a tablet, a screen, and so on. In some embodiments, operation 506 further includes transmitting educational content with the quantum state information, where the educational content can be an explanation, an instruction, a question, an equation, and/or different information.

Figure 5B:
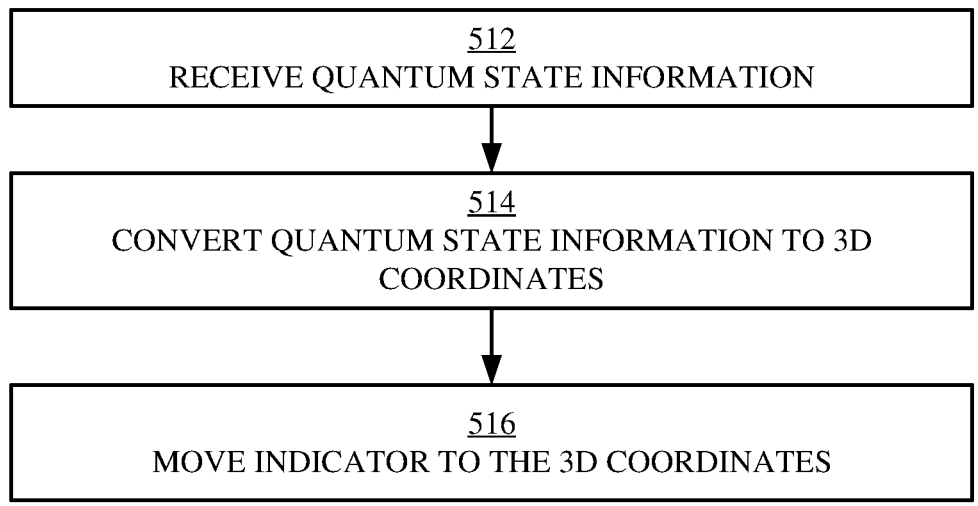
FIG. 5B illustrates a flowchart of an example method for converting quantum state information to three-dimensional coordinates for orienting an indicator in a quantum state visualization device, in accordance with embodiments of the present disclosure.

FIG. 5B illustrates a method 510 for converting quantum state information to 3D coordinates for moving an indicator to represent the quantum state information, in accordance with embodiments of the present disclosure. The method 510 can be implemented by a control unit integrated into, or communicatively coupled to, a quantum state visualization device (e.g., control unit 600 of FIG. 6).

Operation 512 includes receiving quantum state information from user input. The quantum state information can be received from, for example, a smartphone interface presenting a mobile application related to quantum state visualization and communicatively coupled to a quantum state visualization device. As another example, the quantum state information can be received based on input to a computer, where the computer is communicatively coupled to a quantum state visualization device by a wired or wireless connection. The quantum state information can be a quantum state generally represented in the format $a|0\rangle+b|1\rangle$, where a and b represent relative deviations from the primary basis vectors.

Operation 514 includes converting the quantum state information to 3D coordinates. The quantum state information can be converted to 3D coordinates using equations and algorithms known in the art of quantum mechanics, particularly in relation to Hilbert spaces and/or Bloch spheres. The 3D coordinates can be cylindrical coordinates, spherical coordinates, Euclidean coordinates, or a custom coordinate notation system useful for modifying the position of the indicator in the quantum state visualization device.

Operation 516 includes moving the indicator of the quantum state visualization device in accordance with the 3D coordinates, such that the indicator is aligned according to the 3D coordinates and represents the quantum state information received in operation 512. In some embodiments, operation 516 includes transmitting the 3D coordinates from one control unit to another control unit where the two control units are communicatively coupled by a wired or wireless network (e.g., transmitting the 3D coordinates from a smartphone to a 3-axis motor of a quantum state visualization device via a BLUETOOTH® connection).

In some embodiments, operation 516 includes moving the indicator of the quantum state visualization device along a predetermined path between the current location and the 3D coordinates, where the predetermined path can be used to represent a qubit interacting with one or more quantum logic gates.

Figure 6:
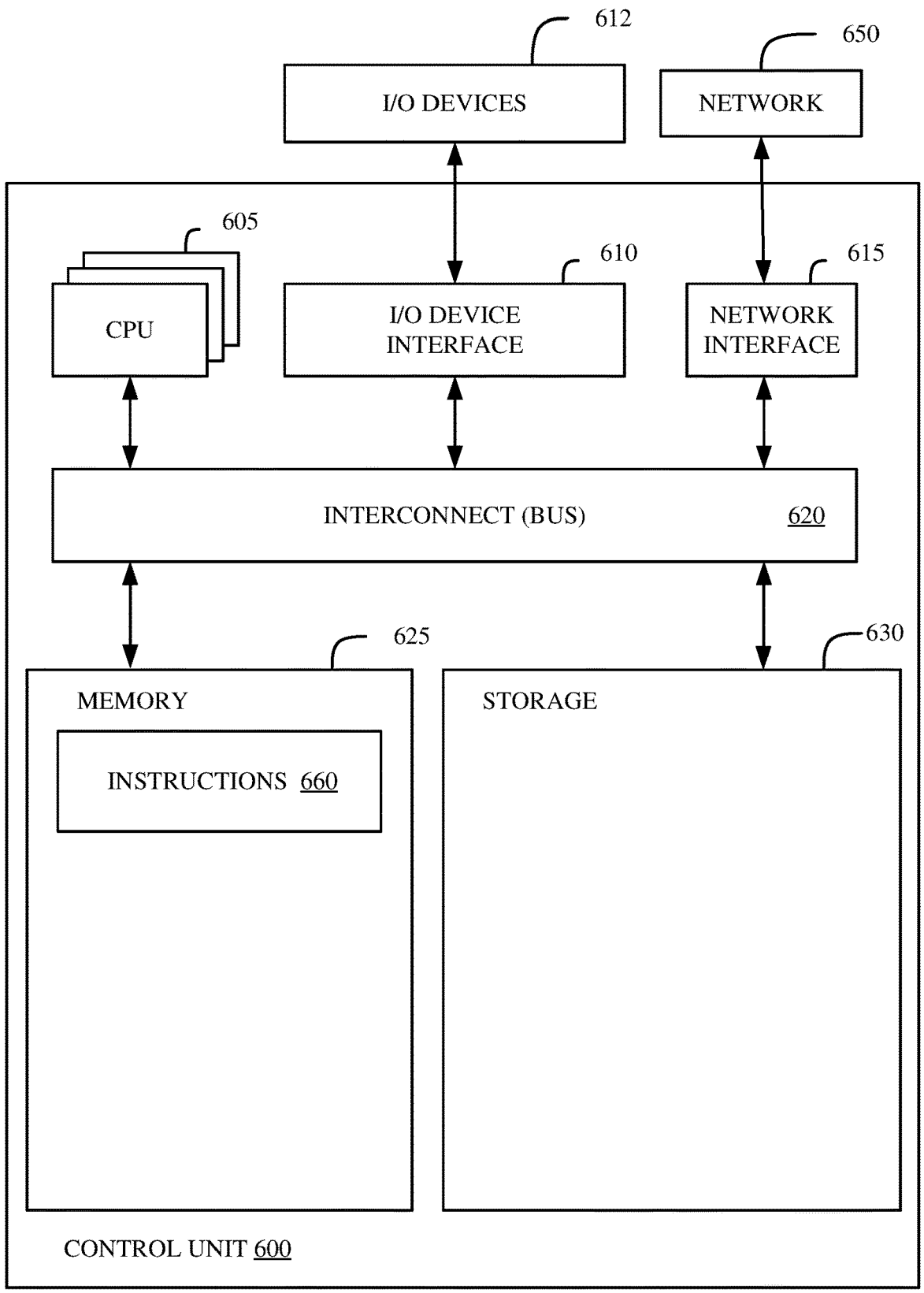
FIG. 6 illustrates a block diagram of an example control unit, in accordance with embodiments of the present disclosure.

FIG. 6 illustrates a block diagram of an example control unit 600 in accordance with some embodiments of the present disclosure. In some embodiments, control unit 600 is representative of hardware capability present in a user device such as user device 414B, a control unit such as control unit 414A, a 3-axis motor such as 3-axis motor 410A, 410B, or a different component that can be communicatively coupled to, or physically incorporated into, a quantum state visualization device as discussed in the present disclosure.

In various embodiments, control unit 600 can perform the methods described in FIGS. 5A and/or 5B. In some embodiments, control unit 600 provides instructions for the aforementioned methods and/or functionalities to a client machine such that the client machine executes the method, or a portion of the method, based on the instructions provided by the control unit 600.

The control unit 600 includes a memory 625, storage 630, an interconnect (e.g., BUS) 620, one or more CPUs 605 (also referred to as processors 605 herein), an I/O device interface 610, I/O devices 612, and a network interface 615.

Each CPU 605 retrieves and executes programming instructions stored in the memory 625 or storage 630. The interconnect 620 is used to move data, such as programming instructions, between the CPUs 605, I/O device interface 610, storage 630, network interface 615, and memory 625. The interconnect 620 can be implemented using one or more busses. The CPUs 605 can be a single CPU, multiple CPUs, or a single CPU having multiple processing cores in various embodiments. In some embodiments, a CPU 605 can be a digital signal processor (DSP). In some embodiments, CPU 605 includes one or more 3D integrated circuits (3DICs) (e.g., 3D wafer-level packaging (3DWLP), 3D interposer based integration, 3D stacked ICs (3D-SICs), monolithic 3D ICs, 3D heterogeneous integration, 3D system in package (3DSiP), and/or package on package (PoP) CPU configurations). Memory 625 is generally included to be representative of a random access memory (e.g., static random access memory (SRAM), dynamic random access memory (DRAM), or Flash). The storage 630 is generally included to be representative of a non-volatile memory, such as a hard disk drive, solid state device (SSD), removable memory cards, optical storage, or flash memory devices. In an alternative embodiment, the storage 630 can be replaced by storage area-network (SAN) devices, the cloud, or other devices connected to the control unit 600 via the I/O device interface 610 or a network 650 via the network interface 615.

In some embodiments, the memory 625 stores instructions 660. However, in various embodiments, the instructions 660 are stored partially in memory 625 and partially in storage 630, or they are stored entirely in memory 625 or entirely in storage 630, or they are accessed over a network 650 via the network interface 615.

Instructions 660 can be processor-executable instructions for performing any portion of, or all of, any of the methods of FIGS. 5A and/or 5B.

In various embodiments, the I/O devices 612 include an interface capable of presenting information and receiving input. For example, I/O devices 612 can present information to a user interacting with control unit 600 and receive input from the user.

Control unit 600 is connected to the network 650 via the network interface 615. Network 650 can comprise a physical, wireless, cellular, or different network.

Embodiments of the present invention can be a system, a method, and/or a computer program product at any possible technical detail level of integration. The computer program product can include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium can be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network can comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention can be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as SMALLTALK®, C++, or the like, and procedural programming languages, such as the "C" programming language or similar programming languages. The computer readable program instructions can execute entirely on the user's computer, partly on the user's computer, as a stand-alone software package, partly on the user's computer and partly on a remote computer or entirely on the remote computer or server. In the latter scenario, the remote computer can be connected to the user's computer through any type of network, including a local area network (LAN) or a wide area network (WAN), or the connection can be made to an external computer (for example, through the Internet using an Internet Service Provider). In some embodiments, electronic circuitry including, for example, programmable logic circuitry, field-programmable gate arrays (FPGA), or programmable logic arrays (PLA) can execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions can be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions can also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions can also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams can represent a module, segment, or subset of instructions, which comprises one or more executable instructions for implementing the specified logical function(s). In some alternative implementations, the functions noted in the blocks can occur out of the order noted in the Figures. For example, two blocks shown in succession can, in fact, be executed substantially concurrently, or the blocks can sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While it is understood that the process software (e.g., any of the instructions stored in instructions 660 of FIG. 6 and/or any software configured to perform any subset of the methods described with respect to FIGS. 5A-5B) can be deployed by manually loading it directly in the client, server, and proxy computers via loading a storage medium such as a CD, DVD, etc., the process software can also be automatically or semi-automatically deployed into a computer system by sending the process software to a central server or a group of central servers. The process software is then downloaded into the client computers that will execute the process software. Alternatively, the process software is sent directly to the client system via e-mail. The process software is then either detached to a directory or loaded into a directory by executing a set of program instructions that detaches the process software into a directory. Another alternative is to send the process software directly to a directory on the client computer hard drive. When there are proxy servers, the process will select the proxy server code, determine on which computers to place the proxy servers' code, transmit the proxy server code, and then install the proxy server code on the proxy computer. The process software will be transmitted to the proxy server, and then it will be stored on the proxy server.

Embodiments of the present invention can also be delivered as part of a service engagement with a client corporation, nonprofit organization, government entity, internal organizational structure, or the like. These embodiments can include configuring a computer system to perform, and deploying software, hardware, and web services that implement, some or all of the methods described herein. These embodiments can also include analyzing the client's operations, creating recommendations responsive to the analysis, building systems that implement subsets of the recommendations, integrating the systems into existing processes and infrastructure, metering use of the systems, allocating expenses to users of the systems, and billing, invoicing (e.g., generating an invoice), or otherwise receiving payment for use of the systems.

The terminology used herein is for the purpose of describing particular embodiments only and is not intended to be limiting of the various embodiments. As used herein, the singular forms "a," "an," and "the" are intended to include the plural forms as well, unless the context clearly indicates otherwise. It will be further understood that the terms "includes" and/or "including," when used in this specification, specify the presence of the stated features, integers, steps, operations, elements, and/or components, but do not preclude the presence or addition of one or more other features, integers, steps, operations, elements, components, and/or groups thereof. In the previous detailed description of example embodiments of the various embodiments, reference was made to the accompanying drawings (where like numbers represent like elements), which form a part hereof, and in which is shown by way of illustration specific example embodiments in which the various embodiments can be practiced. These embodiments were described in sufficient detail to enable those skilled in the art to practice the embodiments, but other embodiments can be used and logical, mechanical, electrical, and other changes can be made without departing from the scope of the various embodiments. In the previous description, numerous specific details were set forth to provide a thorough understanding the various embodiments. But, the various embodiments can be practiced without these specific details. In other instances, well-known circuits, structures, and techniques have not been shown in detail in order not to obscure embodiments.

Different instances of the word "embodiment" as used within this specification do not necessarily refer to the same embodiment, but they can. Any data and data structures illustrated or described herein are examples only, and in other embodiments, different amounts of data, types of data, fields, numbers and types of fields, field names, numbers and types of rows, records, entries, or organizations of data can be used. In addition, any data can be combined with logic, so that a separate data structure may not be necessary. The previous detailed description is, therefore, not to be taken in a limiting sense.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

Although the present disclosure has been described in terms of specific embodiments, it is anticipated that alterations and modification thereof will become apparent to the skilled in the art. Therefore, it is intended that the following claims be interpreted as covering all such alterations and modifications as fall within the true spirit and scope of the disclosure.

What is claimed is:

1. A quantum state visualization device comprising:
   at least a portion of a spherical shell;
   a support structure affixed to the spherical shell, a portion of the support structure intersecting a center of the spherical shell; and
   an indicator pivotally attached to the support structure via a 3-axis motor located at the portion of the support structure intersecting the center of the spherical shell, wherein the indicator is representative of a quantum state based on its position relative to the spherical shell.

2. The quantum state visualization device of claim 1, wherein the spherical shell comprises a plastic material selected from a group consisting of: a thermoplastic, a thermoplastic elastomer, and a thermoset plastic.

3. The quantum state visualization device of claim 1, wherein the portion of the spherical shell is selected from a group consisting of: a whole spherical shell, a half spherical shell, and a three-quarter spherical shell.

4. The quantum state visualization device of claim 1, wherein the support structure is attached to the spherical shell at one and only one point, wherein an end of the support structure intersects the center of the spherical shell, and wherein the indicator is pivotally attached to the end of the support structure.

5. The quantum state visualization device of claim 1, wherein the support structure is attached to the spherical shell at two antipodal points of the spherical shell.

6. The quantum state visualization device of claim 1, wherein the 3-axis motor is operated by a control unit communicatively coupled to the 3-axis motor.

7. The quantum state visualization device of claim 6, wherein the control unit comprises a user device executing a mobile application.

8. The quantum state visualization device of claim 6, wherein the control unit is communicatively coupled to the 3-axis motor by a wireless connection.

9. The quantum state visualization device of claim 1, wherein the indicator comprises a rod.

10. The quantum state visualization device of claim 9, wherein the rod is extendable and retractable, wherein retracting the rod to less than half a diameter of the spherical shell represents a mixed quantum state.

11. The quantum state visualization device of claim 9, wherein the rod comprises a series of lights incorporated into the rod, wherein the series of lights represent a finite set of predefined mixed quantum states, and wherein the quantum state is one of the finite set of predefined mixed quantum states.

12. The quantum state visualization device of claim 1, wherein the indicator is a laser, and wherein light from the laser that intersects the spherical shell is representative of the quantum state.

13. The quantum state visualization device of claim 1, further comprising a magnetic manipulation device generating a magnetic force between the magnetic manipulation device and the indicator to move the indicator to the quantum state.

14. A system comprising:
- a quantum state visualization device comprising at least a portion of a spherical shell, a support structure affixed to the spherical shell and intersecting a center of the spherical shell, a 3-axis motor attached to the support structure at the center of the spherical shell, and an indicator attached to the 3-axis motor, wherein the indicator is representative of a quantum state based on its position relative to the spherical shell; and
- a control unit communicatively coupled the quantum state visualization device and comprising a computer-readable storage medium storing program instructions and a processor configured to execute the program instructions to cause the control unit to perform a method comprising:
  - converting quantum state information to three-dimensional coordinates; and
  - transmitting the three-dimensional coordinates to the 3-axis motor to cause the 3-axis motor to orient the indicator in the spherical shell according to the three-dimensional coordinates.

15. The system according to claim 14, the method further comprising:
- generating a predefined path from a current position of the indicator to the three-dimensional coordinates, wherein the predefined path represents a quantum bit interacting with at least one quantum logic gate; and
- transmitting the predefined path to the 3-axis motor to cause the 3-axis motor to orient the indicator by following the predefined path.

16. The system according to claim 14, the method further comprising:
- transmitting educational content related to the quantum state information to a plurality of user devices wirelessly connected to the control unit.

17. A method for visualizing a quantum state on a three-dimensional quantum state visualization device, the method comprising:
- inputting, to a control unit communicatively coupled to the three-dimensional quantum state visualization device, first quantum state information;
- converting, by the control unit, the first quantum state information to three-dimensional coordinates; and
- moving, based on instructions transmitted from the control unit to the three-dimensional quantum state visualization device, an indicator of the three-dimensional quantum state visualization device to the three-dimensional coordinates corresponding to the first quantum state information.

18. The method according to claim 17, wherein moving the indicator comprises actuating a 3-axis motor attached to the indicator, wherein the 3-axis motor is attached to a support structure at an approximate center of at least a portion of a spherical shell, and wherein the support structure is affixed to the spherical shell at one or more points.

19. The method according to claim 17, wherein the indicator is a laser, and wherein light from the laser that intersects the three-dimensional quantum state visualization device is representative of the first quantum state information.

20. The method according to claim 17, wherein the indicator comprises a rod.

* * * * *